United States Patent [19]

Kopko

[11] Patent Number: 5,076,064
[45] Date of Patent: Dec. 31, 1991

[54] METHOD AND REFRIGERANTS FOR REPLACING EXISTING REFRIGERANTS IN CENTRIFUGAL COMPRESSORS

[75] Inventor: William L. Kopko, York, Pa.
[73] Assignee: York International Corporation, York, Pa.
[21] Appl. No.: 606,619
[22] Filed: Oct. 31, 1990
[51] Int. Cl.$^5$ .............................................. F25B 45/00
[52] U.S. Cl. .......................................... 62/77; 62/292; 62/114
[58] Field of Search .................... 62/77, 149, 292, 114

[56] References Cited

U.S. PATENT DOCUMENTS

| | | | |
|---|---|---|---|
| 3,996,765 | 12/1976 | Mullins | 62/77 |
| 4,089,186 | 5/1978 | Rojey et al. | 62/101 |
| 4,148,198 | 4/1979 | Kregoski | 62/77 |
| 4,151,725 | 5/1979 | Kountz et al. | 62/182 |
| 4,344,292 | 8/1982 | Rojey | 62/114 |
| 4,350,020 | 9/1982 | Rojey | 62/93 |
| 4,406,135 | 9/1983 | Rojey et al. | 62/114 |
| 4,482,465 | 11/1984 | Gray | 252/67 |
| 4,755,316 | 7/1988 | Magid et al. | 252/68 |
| 4,810,403 | 3/1989 | Bivens et al. | 252/67 |
| 4,812,250 | 3/1989 | Ambrosino et al. | 252/67 |

Primary Examiner—Albert J. Makay
Assistant Examiner—John Sollecito
Attorney, Agent, or Firm—Finnegan, Henderson, Farabow, Garrett & Dunner

[57] ABSTRACT

A method for substituting a replacement refrigerant for an existing refrigerant in a centrifugal compressor includes the steps of selecting a desired impeller Mach number for the centrifugal compressor, selecting a base refrigerant constituent, combining at least one additive refrigerant constituent with the base refrigerant constituent to form a replacement refrigerant having at least one physical or chemical property different from the existing refrigerant and substantially providing the desired impeller Mach number in the centrifugal compressor, and replacing the existing refrigerant with the replacement refrigerant. The existing refrigerant can be replaced by choosing a particular molecular weight or acoustical velocity which will provide the desired impeller Mach number.

19 Claims, 2 Drawing Sheets

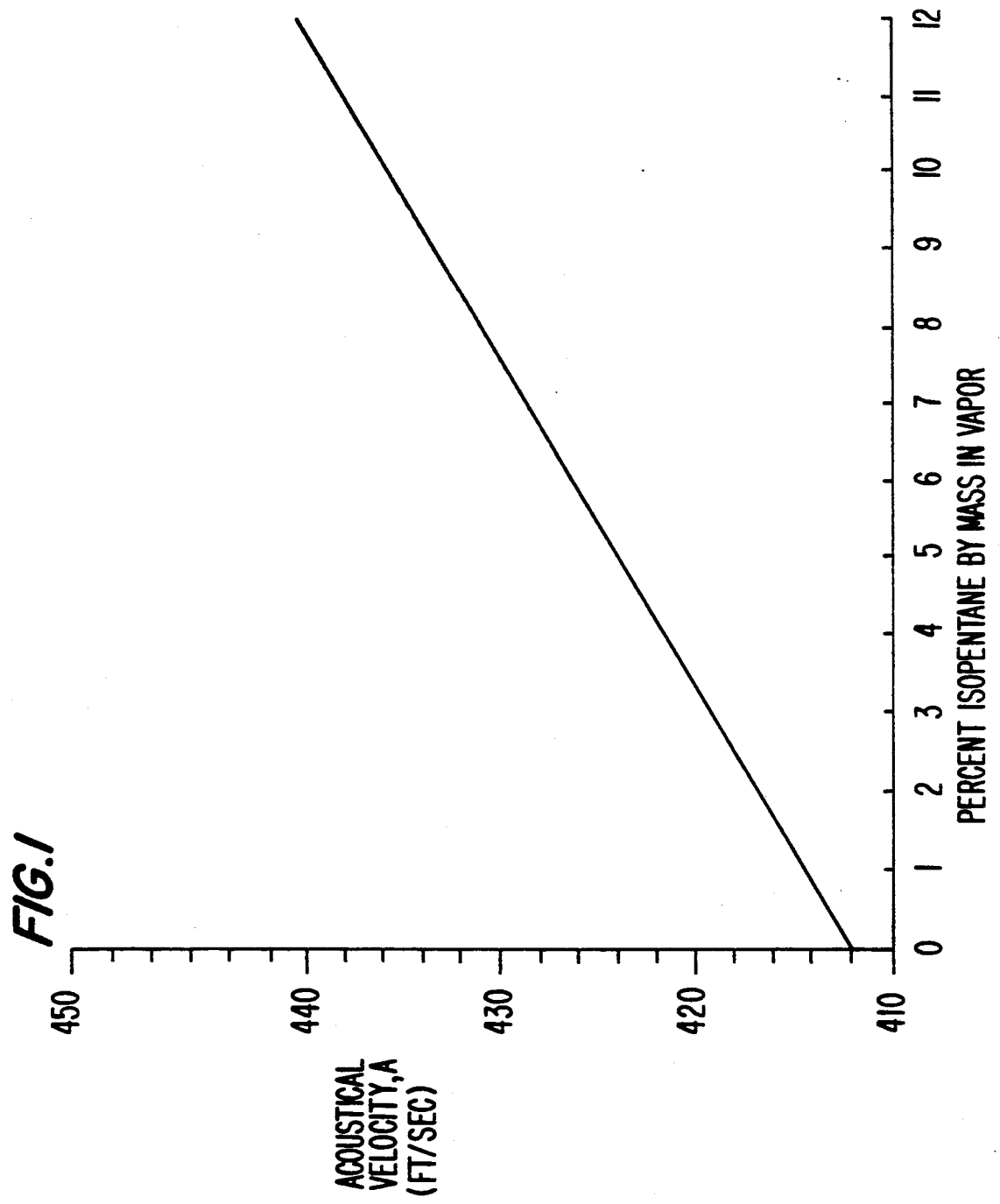

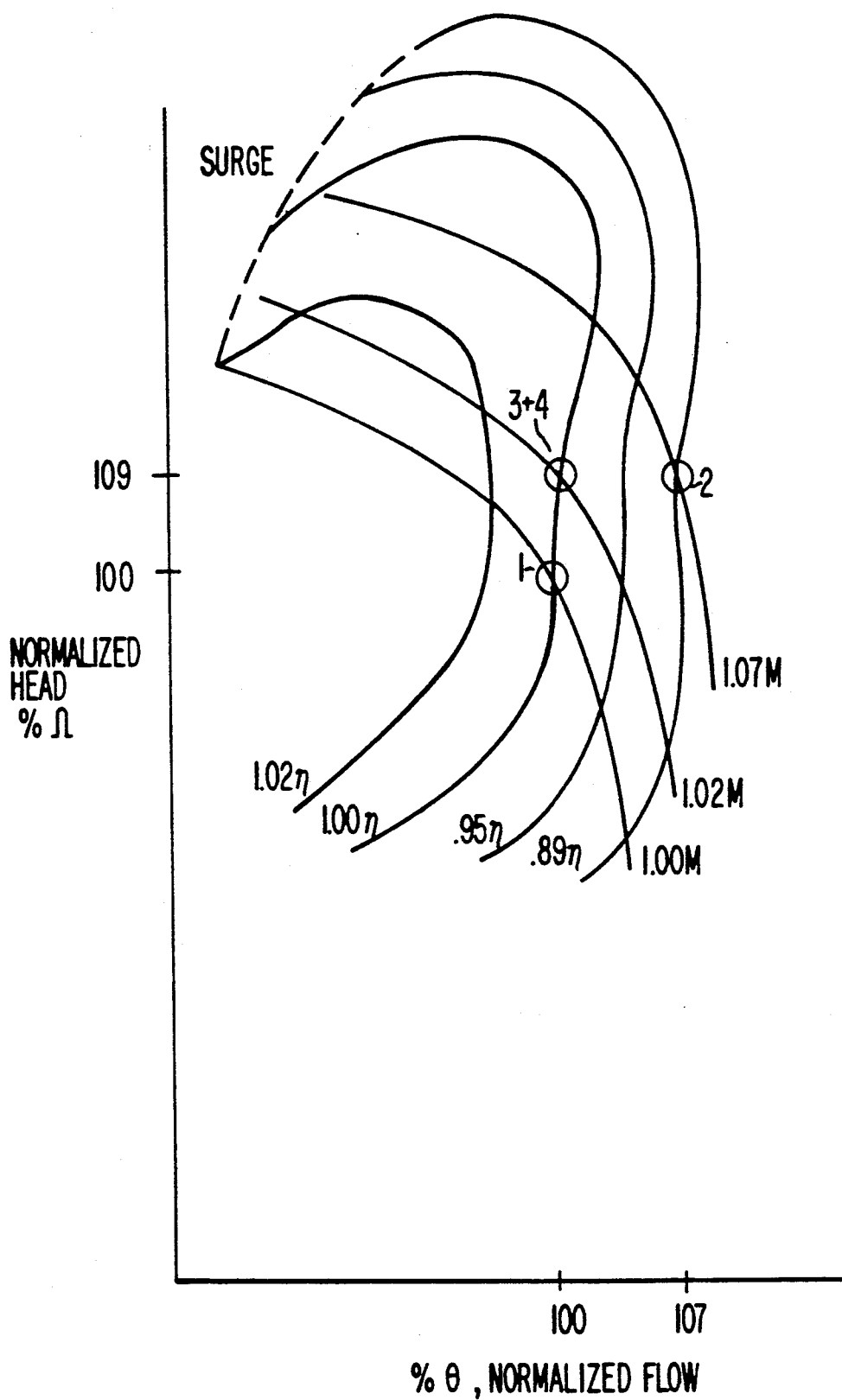

METHOD AND REFRIGERANTS FOR REPLACING EXISTING REFRIGERANTS IN CENTRIFUGAL COMPRESSORS

BACKGROUND OF THE INVENTION

A. Field of the Invention

The present invention relates to a method for replacing an existing refrigerant in a centrifugal compressor while maintaining or modifying the performance of the centrifugal compressor.

B. Description of the Related Art

Typically, centrifugal compressors are designed by selecting a gear arrangement which will provide the desired impeller speed and impeller Mach number when used in combination with a predetermined refrigerant. Impeller Mach number is the tip speed of the impeller divided by the acoustical velocity of the refrigerant. The acoustical velocity is the speed of sound in the refrigerant vapor.

A current problem which arises with centrifugal compressors is that commonly used refrigerants, such as R11, are fully halogenated chlorofluorocarbons (CFCs). Fully halogenated CFCs are a class of compounds which can adversely affect the environment, such as by depleting the ozone layer. Therefore, it is desirable to replace existing refrigerants, such as R11, with more environmentally acceptable refrigerants.

Suitable replacement refrigerants often do not have the same molecular weight as the existing refrigerant. Because the acoustical velocity of the refrigerant is related to the molecular weight of the refrigerant, the impeller Mach number will be altered if a refrigerant having a different molecular weight is utilized in the centrifugal compressor If the replacement refrigerant has a molecular weight higher than that of the existing refrigerant, the acoustical velocity of the replacement refrigerant will be lower than the acoustical velocity of the existing refrigerant. Therefore, the impeller Mach number will be higher with the replacement refrigerant than with the existing refrigerant. Alternatively, if the replacement refrigerant has a molecular weight lower than that of the existing refrigerant, the impeller Mach number of the centrifugal compressor will be lower with the replacement refrigerant.

Increasing or decreasing the impeller Mach number of the centrifugal compressor will place the operating point in an inefficient region of the compressor map. In other words, the centrifugal compressor will be placed in an inefficient operating condition.

Known ways to maintain centrifugal compressor performance while replacing the existing refrigerant are to alter the gear arrangement to enable the centrifugal compressor to operate efficiently while using the replacement refrigerant, or make structural modifications to the centrifugal compressor. For example, by changing the gear arrangement, the speed of the impeller can be slowed, thereby adjusting the impeller Mach number to provide better efficiency. Such methods are expensive and also have other disadvantages which will be discussed later.

There are also circumstances where it would be desirable to modify the performance of an existing centrifugal compressor. Currently, one way of accomplishing this is to make structural modifications to the centrifugal compressor, but, as discussed above in regard to maintaining compressor performance, this is an unsatisfactory method due to the cost, as well as the loss of the availability of the compressor.

SUMMARY OF THE INVENTION

An object of the invention is to provide a method for replacing the existing refrigerant in a centrifugal compressor without having to change the gear arrangement or make other structural modifications to the centrifugal compressor.

Another object of the invention is to provide such a method whereby the performance of the centrifugal compressor can be maintained or modified without having to change the gear arrangement or make other structural modifications to the centrifugal compressor.

Additional objects and advantages of the invention will be set forth in part in the description which follows, and in part will be apparent from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a method for replacing an existing refrigerant in a centrifugal compressor, the method comprising the steps of selecting a desired impeller Mach number for the centrifugal compressor, selecting a base refrigerant constituent, combining at least one additive refrigerant constituent with the base refrigerant constituent to form a replacement refrigerant having at least one physical or chemical difference from the existing refrigerant and providing a desired impeller Mach number in the centrifugal compressor, and replacing the existing refrigerant with the replacement refrigerant.

In typical applications, the method of the present invention allows the existing refrigerant to be replaced while maintaining substantially the same impeller Mach number. Instead of altering the gear arrangement or compressor structure to change the centrifugal compressor speed, the acoustical velocity of the refrigerant is changed to give the desired impeller Mach number. This alternative allows the centrifugal compressor performance to be maintained without making expensive changes to the centrifugal compressor.

The method of the present invention also allows the performance of the centrifugal compressor to be modified without altering the gear arrangement or requiring other structural modifications to the centrifugal compressor.

The present invention also allows for the replacement of the existing refrigerant with a less expensive or a less environmentally damaging replacement refrigerant without altering the performance of the centrifugal compressor.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

FIG. 1 is a graphic illustration of acoustical velocity versus isopentane content for R123/isopentane refrigerant mixtures.

FIG. 2 is a compressor map highlighting an embodiment of the invention.

DESCRIPTION OF THE PREFERRED EMBODIMENTS

Reference will now be made in detail to the presently preferred embodiments of the invention, examples of which are illustrated in the accompanying drawings.

The present invention provides a method for replacing an existing refrigerant with a replacement refrigerant while maintaining or modifying centrifugal compressor performance. One aspect of the present invention is formulating the desired composition of the replacement refrigerant to obtain the desired performance.

The acoustical velocity (A) of a refrigerant is determined by the following formula:

$$A = \sqrt{((C_p/C_v) \cdot R \cdot T)/W}$$

where $C_p$ = the constant pressure specific heat (J/kg·K)
$C_v$ = the constant volume specific heat (J/kg·K)
R = the specific gas constant (J/kg·K)
T = the temperature (degrees Kelvin)
W = the molecular weight of the refrigerant vapor In accordance with the above equation, the acoustical velocity of the refrigerant operating within a given narrow temperature range is a direct function of the inverse of the square root of the average molecular weight of the refrigerant. Therefore, changing the molecular weight of the refrigerant mixture alters the acoustical velocity of the refrigerant and thus changes the impeller Mach number of the centrifugal compressor. When utilizing the method of the invention, centrifugal compressor performance can be maintained or modified by adjusting the composition of the replacement refrigerant without the necessity of altering the gear arrangement or making other structural modifications to the centrifugal compressor.

In order to maintain the centrifugal compressor performance while replacing the existing refrigerant, the predetermined impeller Mach number should be the same as that achieved by the existing refrigerant. Because molecular weight is related to acoustical velocity and acoustical velocity determines impeller Mach number, performance can be maintained by formulating a replacement refrigerant which has the same molecular weight as the existing refrigerant, or which has a molecular weight which theoretically will provide the same impeller Mach number as the original refrigerant. The performance can more accurately be maintained by formulating a replacement refrigerant which has the same acoustical velocity as the original refrigerant, or which has an acoustical velocity which theoretically will provide the same impeller Mach number as the existing refrigerant. The performance can most accurately be maintained by formulating a replacement refrigerant which provides the same impeller Mach number when in use in the centrifugal compressor as the impeller Mach number which was provided by the existing refrigerant.

Similar to maintaining original performance, a desired different performance can be achieved by formulating a replacement refrigerant having a molecular weight which theoretically will provide the desired impeller Mach number. The desired results can more accurately be achieved by formulating a replacement refrigerant having an acoustical velocity which theoretically will provide the desired impeller Mach number. The desired results can most accurately be achieved by formulating a replacement refrigerant which actually provides the desired impeller Mach number when in use in the centrifugal compressor.

When replacing the existing refrigerant, it is important that the replacement refrigerant is as close as possible to an azeotrope so as to avoid problems associated with fractional distillation. The composition of the replacement refrigerant must be approximately the same in the vapor state and the liquid state. Preferably the replacement refrigerant should be completely azeotropic. However, it is acceptable for the replacement refrigerant to be only substantially azeotropic.

If the replacement refrigerant is not completely azeotropic, it is desired that any flammable constituents have a boiling point lower than that of the nonflammable constituents to ensure that any leaks do not eventually result in a flammable mixture. If the nonflammable constituents have a boiling point lower than that of the flammable constituents, the nonflammable constituents will transform into the vapor phase before the flammable constituents, should a leak occur. Therefore, the nonflammable constituents will escape from the centrifugal compressor and be dispersed into the atmosphere, and a higher concentration of flammable constituents will remain in the centrifugal compressor. This will create a safety hazard. On the other hand, if the flammable constituents have a boiling point lower than that of the nonflammable constituents, the flammable constituents will escape into the atmosphere and be safely dispersed. A higher concentration of nonflammable constituents will remain in the centrifugal compressor. The nonflammable constituents will not create a safety hazard.

Preferably, the replacement refrigerant is nonflammable, low in toxicity, capable of operating at the pressure at which the centrifugal compressor is to be operated, and is readily available. In addition, the constituents should not chemically react under load conditions.

The invention will be further clarified by the following example, which is intended to be purely exemplary of the invention. R11 is an environmentally unacceptable refrigerant because it is a fully halogenated CFC. Therefore, it is necessary to replace the R11 refrigerant with a more environmentally safe replacement refrigerant. In order to maintain the operating condition of the centrifugal compressor, it is necessary to utilize a replacement refrigerant which has a molecular weight close to that of R11.

R123 and R123a are suitable replacement refrigerants. Both R123 and R123a are low in toxicity, having projected threshold limit values of 100 ppm and 300 ppm, respectively. R123 and R123a have the same molecular weight, which means the acoustical velocity of each is approximately the same. However, the molecular weights of R123 and R123a are higher than that of R11, and thus the acoustical velocities of R123 and R123a are lower than the acoustical velocity of R11. The lower acoustical velocities of R123 and R123a means that the impeller Mach number of the centrifugal compressor will be higher with R123 or R123a than with R11. Simply replacing R11 with R123 or R123a will place the centrifugal compressor in an inefficient operating condition.

In order to prevent inefficient operation of the centrifugal compressor, a small amount of refrigerant material with a lower molecular weight must be added to the R123 or R123a to decrease the molecular weight of the replacement refrigerant, which increases its acoustical velocity, and, thereby, lowers the impeller Mach number of the centrifugal compressor. It is desirable to find an additive constituent to combine with R123 or R123a which has a molecular weight lower than that of R123 and R123a and which, when in combination with R123 or R123a, will form a substantially azeotropic replacement refrigerant over a wide range of possible compositions, so as to avoid problems associated with fractional distillation.

There are a variety of materials that have boiling points close to that of R123 and R123a which can be considered for forming a replacement refrigerant. Table 1 lists R11, R123, R123a and other possible additive constituents for forming a replacement refrigerant for R11.

TABLE 1

R11 and Possible Constituents For Forming Replacement Refrigerants

| Material | Formula | Molecular Weight | Boiling Point (°C.) | Vapor Weight % R123 Needed to Match R11 Mach | Vapor Weight % R123 Needed to Give Non-Flammable Mixture |
|---|---|---|---|---|---|
| R11 | CCl$_3$F | 137.5 | 24 | 0% | 0% |
| R123 | CHCl$_2$CF$_3$ | 153 | 27.9 | — | — |
| R123a | CHClFCF$_2$Cl | 153 | 29.9 | — | — |
| isopentane | (CH$_3$)$_2$CHCH$_2$CH$_3$ | 72 | 27.9 | 90% | ~90% |
| R141b | CH$_3$CFCl$_2$ | 117 | 32 | 63% | 30% |
| R152 | CFH$_2$CFH$_2$ | 66 | 30 | 91% | <75% |
| E143 | CFH$_2$OCF$_2$H | 100 | 30.1 | 79% | <75% |

As shown in Table 1, isopentane, R141b, R152, and E143 each has a molecular weight lower than that of R123 and R123a, and could be combined with R123 or R123a to form a replacement refrigerant with a molecular weight or an acoustical velocity which matches that of R11.

A presently preferred replacement for R11 is a mixture of R123 and isopentane. Isopentane has a relatively low toxicity with a threshold limit value of 600 ppm. Therefore, the replacement refrigerant formed by the mixture of R123 and isopentane has a low toxicity with a threshold limit value greater than that of pure R123. Fractional distillation is not a problem because the boiling point of isopentane is the same as that of R123.

FIG. 1 shows the acoustical velocity of R123/isopentane mixtures versus the percentage of isopentane in the mixture. A mixture of 92% R123 and 8% isopentane provides a replacement refrigerant having a molecular weight of 140.4 and an acoustical velocity of approximately 431 ft/sec.

The flammability of the replacement mixture is an area of concern. It is necessary to provide a sufficient amount of R123 to ensure a nonflammable R123/isopentane mixture. Other CFC/hydrocarbon mixtures are nonflammable only until the CFC reaches a limit of roughly 10% by weight of the hydrocarbon. If this limit holds for R123/isopentane mixtures, the amount of isopentane necessary to raise the acoustical velocity of the replacement refrigerant to that of R11 is very close to the flammability limit.

FIG. 2 is a compressor map which plots the head factor versus the capacity factor for an exemplary centrifugal compressor. The dimensionless head factor ($\Omega$) and the dimensionless capacity factor ($\Theta$) are determined by the following equations:

$$\Omega = \frac{H \times g_c}{A^2}$$

$$\Theta = \frac{S}{A \times D^2}$$

where
H = head (ft lbf/lbm)
$g_c$ = unit conversion constant = 32.2 lbm ft/sec$^2$/lbf
A = the acoustical velocity of the refrigerant (ft/sec)
S = volumetric flow rate at compressor suction (ft3/sec)
D = the impeller diameter (ft)

The original design condition, the operating point of the centrifugal compressor when using R11, is shown at point 1. Point 2 indicates the approximate operating point of the centrifugal compressor when using a pure R123 replacement refrigerant. Point 3 is the approximate operating point when using a 92% R123 and 8% isopentane replacement refrigerant. Point 4 is the approximate operating point when using a pure R123 replacement refrigerant and changing the gear arrangement to give a desired impeller Mach number (M). Table 2 summarizes the results.

TABLE 2

Comparison Between R11, Pure R123, And A R123/Isopentane Mixture

| Point | Refrigerant | rpm | A (ft/s) | % M | % $\Omega$ | % $\Theta$ | % of design compressor eff. | % of design tons | % of design hp | % of design chiller efficiency |
|---|---|---|---|---|---|---|---|---|---|---|
| 1 | R11 | 9330 | 440 | 100 | 100 | 100 | 100 | 100 | 100 | 100 |
| 2 | R123 | 9330 | 412 | 107 | 109 | 107 | 89 | 84 | 96 | 87 |
| 3 | 92% | 9330 | 430 | 102 | 109 | 101 | 100 | 83 | 85 | 98 |

TABLE 2-continued
Comparison Between R11, Pure R123, And A R123/Isopentane Mixture

| Point | Refrigerant | rpm | A (ft/s) | % M | % Ω | % θ | % of design compressor eff. | % of design tons | % of design hp | % of design chiller efficiency |
|---|---|---|---|---|---|---|---|---|---|---|
| 4 | R123/8% isopentane R123 | 8940 | 412 | 102 | 109 | 101 | 100 | 80 | 82 | 98 |

Replacing R11 with pure R123 results in approximately a 16% loss in capacity and a 13% penalty in efficiency. Using a mixture of 92% R123 and 8% isopentane in place of R11, gives approximately a 17% loss in capacity, but maintains substantially the same efficiency. Using pure R123 and changing the gear arrangement to give a desired impeller Mach number provides the same efficiency as the R123/isopentane mixture, but results in 3% less capacity. Therefore, the R123/isopentane mixture provides more capacity, as well as dispensing with the need for costly gear replacement.

A preferred embodiment comprises R123 in the range of about 85 to 99% by mass and isopentane in the range of about 1 to 15% by mass. A more preferred embodiment comprises R123 in the range of about 90 to 94% by mass and isopentane in the range of about 6 to 10% by mass.

While these results are for a R123/isopentane mixture, similar results would be achieved with any additive to R123 which provides a mixture having the requisite molecular weight as well as satisfying the other requirements.

A R123/R141b replacement refrigerant, which satisfies the operating requirements, would contain over two times the amount of R123 as is necessary to make the replacement refrigerant nonflammable. However, R141b is the flammable constituent and its boiling point is higher than that of R123, which means that leaks may eventually result in a flammable mixture in the centrifugal compressor. However, R123a has a boiling point which is closer to R141b, thereby decreasing the possibility of a flammable mixture for R123a/R141b mixtures. Therefore, R123a/R141b is a viable mixture for forming a replacement refrigerant.

Another possible replacement refrigerant is a mixture of R152 with either R123 or R123a. A preferred embodiment comprises R123a in the range of about 85 to 99% by mass and R152 in the range of about 1 to 15% by mass. A more preferred embodiment comprises R123a in the range of about 90 to 95% by mass and R152 in the range of about 5 to 10% by mass. Additionally, E143 can be combined with either R123 or R123a to form a replacement refrigerant. R152 and E143 each has a boiling point that is virtually the same as that of R123a, so that fractional distillation will not create a problem.

However, neither R152 or E143 is likely to be available in the near future because it would take approximately 10 years to complete toxicity testing and build production facilities. Only very limited toxicity and stability data is available for these materials.

The following example, which is intended to be purely exemplary of the invention, illustrates the replacement of the existing refrigerant with a replacement refrigerant in order to modify the performance of the centrifugal compressor. The first step in modifying the performance of a centrifugal chiller is to determine the impeller Mach number which will provide the desired results. Modification of the centrifugal compressor performance can then be achieved without gear replacement by replacing the existing refrigerant with a replacement refrigerant having a molecular weight or acoustical velocity which will provide the desired impeller Mach number when in use in the compressor. Various replacement refrigerant compositions can be tested in the centrifugal compressor to determine which composition actually provides the desired impeller Mach number.

Another embodiment of the invention illustrates possible replacements for R12. Table 5 lists R12 and various possible constituents for forming a replacement refrigerant therefor.

TABLE 5
R12 and Possible Constituents For Forming Replacement Refrigerants

| Material | Formula | Molecular Weight | Boiling Point (°C.) | Vapor Weight % R134a Needed to Match R12 Mach |
|---|---|---|---|---|
| R12 | $CF_2Cl_2$ | 121 | −30 | 0% |
| RC216 | $CF_2CF_2CF_2$ | 150 | −31 | 49 |
| R134a | $CH_2FCF_3$ | 102 | −27 | — |

The method for maintaining or modifying the centrifugal chiller performance while replacing R12 is the same as for R11 and involves the consideration of similar factors to form a suitable replacement refrigerant. One currently preferred replacement for R12 is a mixture of RC216 and R134a. A preferred embodiment comprises R134a in the range of about 30 to 70% by mass and RC216 in the range of about 30 to 70% by mass. A more preferred embodiment comprises R134a in the range of about 45 to 55% by mass and RC216 the range of about 45 to 55% by mass.

It will be apparent to those skilled in the art that various modifications and variations can be made in the method of the present invention without departing from the scope or spirit of the invention. For example, the existing refrigerant can be the refrigerant for which the centrifugal compressor was designed or the refrigerant which is actually in use in the centrifugal compressor.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for replacing an existing refrigerant in a centrifugal compressor, the method comprising the steps of:

selecting a desired impeller Mach number for the centrifugal compressor;

selecting a base refrigerant constituent;

combining at least one additive refrigerant constituent with the base refrigerant constituent to form a replacement refrigerant having at least one physical or chemical property different from the existing refrigerant and substantially providing the desired impeller Mach number in the centrifugal compressor; and replacing the existing refrigerant with said replacement refrigerant.

2. The method of claim 1, further comprising the step of maintaining the existing gear arrangement of the centrifugal compressor.

3. The method of claim 1, wherein the replacement refrigerant is substantially azeotropic.

4. The method of claim 1, wherein the impeller Mach number provided by the replacement refrigerant is substantially the same as the impeller Mach number provided by the existing refrigerant.

5. The method of claim 1 wherein the replacement refrigerant has a molecular weight which is substantially the same as the molecular weight of the existing refrigerant.

6. The method of claim 1 wherein the replacement refrigerant has an acoustical velocity which is substantially the same as the acoustical velocity of the existing refrigerant.

7. The method of claim 1 wherein the replacement refrigerant is capable of operating at substantially the same pressure as the existing refrigerant.

8. The method of claim 1 wherein the boiling point of the replacement refrigerant is substantially the same as the boiling point of the existing refrigerant.

9. The method of claim 1 wherein the replacement refrigerant is free from fully halogenated CFC.

10. The method of claim 1 wherein the replacement refrigerant increases the capacity of the compressor without changing the impeller Mach number.

11. The method of claim 1 wherein flammable constituents of the replacement refrigerant have a boiling point higher than that of nonflammable constituents of the replacement refrigerant.

12. The method of claim 1 wherein the boiling point of the base refrigerant constituent and the boiling point of the additive refrigerant constituent are within 5 degrees centigrade of each other.

13. The method of claim 1 wherein the base refrigerant constituent and the additive refrigerant constituent do not chemically react with each other under load conditions.

14. The method of claim 1 wherein the existing refrigerant comprises R11 and the replacement refrigerant comprises R123.

15. The method of claim 14 wherein the replacement refrigerant further comprises at least one of isopentane, R152 or E143.

16. The method of claim 1 wherein the existing refrigerant comprises R11 and the replacement refrigerant comprises R123a.

17. The method of claim 16 wherein the replacement refrigerant further comprises at least one of R152, E143 or R141b.

18. The method of claim 1 wherein the existing refrigerant comprises R12 and the replacement refrigerant comprises R134a.

19. The method of claim 18 wherein the replacement refrigerant further comprises at least RC216.

* * * * *